United States Patent
Pardal et al.

(10) Patent No.: US 11,708,515 B2
(45) Date of Patent: Jul. 25, 2023

(54) ADHESIVE DUAL-COMPONENT COMPOSITION BASED ON POLYURETHANE

(71) Applicant: BOSTIK SA, Colombes (FR)

(72) Inventors: Francis Pardal, Compiègne (FR); Guillaume Michaud, Compiègne (FR); Aurélien Wiegand, Choisy au Bac (FR); David Penet, Ribecourt (FR)

(73) Assignee: BOSTIK SA, Colombes (FR)

( * ) Notice: Subject to any disclaimer, the term of this patent is extended or adjusted under 35 U.S.C. 154(b) by 84 days.

(21) Appl. No.: 16/315,668

(22) PCT Filed: Jul. 7, 2017

(86) PCT No.: PCT/FR2017/051862
§ 371 (c)(1),
(2) Date: Jan. 7, 2019

(87) PCT Pub. No.: WO2018/011491
PCT Pub. Date: Jan. 18, 2018

(65) Prior Publication Data
US 2019/0300766 A1    Oct. 3, 2019

(30) Foreign Application Priority Data

Jul. 12, 2016 (FR) .................... 16 56654

(51) Int. Cl.
| | | |
|---|---|---|
| C09J 175/08 | (2006.01) | |
| B32B 7/12 | (2006.01) | |
| B32B 37/12 | (2006.01) | |
| C08G 18/40 | (2006.01) | |
| C08G 18/42 | (2006.01) | |
| C08G 18/48 | (2006.01) | |
| C08G 18/76 | (2006.01) | |
| C08G 18/79 | (2006.01) | |
| C09J 5/00 | (2006.01) | |
| C09J 175/06 | (2006.01) | |
| C08G 18/32 | (2006.01) | |
| C08G 18/28 | (2006.01) | |
| C09J 175/04 | (2006.01) | |

(52) U.S. Cl.
CPC .............. *C09J 175/08* (2013.01); *B32B 7/12* (2013.01); *B32B 37/12* (2013.01); *C08G 18/289* (2013.01); *C08G 18/3206* (2013.01); *C08G 18/4018* (2013.01); *C08G 18/4202* (2013.01); *C08G 18/4277* (2013.01); *C08G 18/4288* (2013.01); *C08G 18/4825* (2013.01); *C08G 18/4829* (2013.01); *C08G 18/7621* (2013.01); *C08G 18/791* (2013.01); *C09J 5/00* (2013.01); *C09J 175/04* (2013.01); *C09J 175/06* (2013.01); *B32B 2553/00* (2013.01); *C09J 2475/00* (2013.01)

(58) Field of Classification Search
CPC .. C08G 18/4018; C08G 18/10; C08G 18/721; C09J 175/06; C09J 175/08
See application file for complete search history.

(56) References Cited

U.S. PATENT DOCUMENTS

| | | | |
|---|---|---|---|
| 3,915,935 A | | 10/1975 | Abraham et al. |
| 5,070,115 A | * | 12/1991 | Welte ................ C08G 18/4018 521/173 |
| 7,129,312 B1 | | 10/2006 | Krebs et al. |
| 2006/0046067 A1 | | 3/2006 | Kleineberg et al. |
| 2009/0237773 A1 | * | 9/2009 | Cao ..................... C08G 18/758 359/296 |
| 2012/0258306 A1 | * | 10/2012 | Kinzelmann .......... C08G 18/12 428/340 |

FOREIGN PATENT DOCUMENTS

| | | | | |
|---|---|---|---|---|
| FR | 3015510 A1 | | 6/2015 | |
| WO | WO-2010052671 A1 | * | 5/2010 | ............ C08G 18/69 |

OTHER PUBLICATIONS

Machine Translation of WO 2010052671 A1 (Year: 2021).*
ISR/EP; International Search Report and Written Opinion for International Application No. PCT/FR2017/051862 dated Aug. 21, 2017, 11 pages.

* cited by examiner

*Primary Examiner* — Michael M Dollinger
(74) *Attorney, Agent, or Firm* — NK Patent Law

(57) ABSTRACT

The invention relates to an adhesive dual-component composition based on polyurethane, comprising an —NCO component and an —OH component such that: the —NCO component is a composition comprising: A) at least one polyurethane prepolymer comprising at least two NCO terminal groups obtained by the polyaddition reaction of at least one dissymmetric diisocyanate monomer and at least one diol, and B) at least one triisocyanate selected from isocyanurates, biurets, diisocyanate and triol adducts, and the mixtures thereof; the —OH component is a composition comprising at least one polyol; at least one of the polyols or diols is selected from polyether polyols (or polyether diols); at least one of the polyols or diols is selected from polyester polyols (or polyester diols); and the weight ratio of the quantity of polyether polyol(s) to the quantity of polyester polyol(s), defined as $r_4$, ranges from 0.6 to 2.2.

17 Claims, No Drawings

ADHESIVE DUAL-COMPONENT COMPOSITION BASED ON POLYURETHANE

CROSS-REFERENCE TO RELATED APPLICATIONS

This application is a U.S. National Stage application of International Application No. PCT/FR2017/051862, filed on Jul. 7, 2017, which claims the benefit of French Patent Application No. 16 56654, filed Jul. 12, 2016.

FIELD OF THE INVENTION

The present invention relates to a two-component polyurethane-based adhesive composition. The invention also relates to a multilayer structure (or laminate) comprising at least two layers of material bonded together by a layer of the adhesive composition according to the invention. It also relates to a lamination process suitable for the manufacture of said multilayer structure and also to the use of a multilayer structure according to the invention in the field of flexible packaging, in particular for the manufacture of flexible packagings intended for the packaging of foodstuffs, cosmetic products, pharmaceutical products or body hygiene products.

TECHNOLOGICAL BACKGROUND

The flexible packagings intended for the packaging of the most diverse products, such as those manufactured by the food processing, cosmetics or detergents industries, generally consist of several layers (in the form of sheets or films), the thickness of which is between 5 and 150 µm and which consist of different materials, such as paper, a metal (for example aluminum) or also thermoplastic polymers. The corresponding multilayer structure, the thickness of which can vary from 20 to 400 µm, makes it possible to combine the properties of the different individual layers of material and to thus provide the consumer with a combination of characteristics suitable for the final flexible packaging, such as, for example:
  its visual appearance (in particular that of the printed elements presenting the information relating to the packaged product and intended for the consumer),
  a barrier effect to moisture, to gases ($O_2$, $N_2$, $CO_2$ and their mixtures) and/or to light and to ultraviolet (UV) rays,
  contact with food without risk of toxicity or of modification to the organoleptic properties of the packaged foodstuffs,
  chemical resistance for certain products, such as ketchup or liquid soap,
  good behavior at high temperature, for example in the case of pasteurization or sterilization. In particular, the adhesive seal formed by crosslinking of the adhesive layer connecting the individual layers of the packaging has to retain a sufficient level of cohesion after heat treatment, in order to avoid any phenomenon of delamination.

In order to form the final packaging, the laminate is generally shaped by heat sealing at a temperature varying from approximately 120 to 250° C., the latter technique also being used for closing the packaging around the product intended for the consumer.

The various layers of material of which the laminate is composed are combined or assembled by laminating during industrial lamination processes.

These processes employ adhesives and devices (or machines) designed for this purpose. The adhesive composition employed for the purpose of producing the laminate is often described by the term of "lamination adhesive".

These processes first of all comprise a stage of coating the adhesive composition over a first layer of material, which consists of the deposition of a continuous layer of adhesive with a controlled thickness generally of less than 10 µm, corresponding to an amount of adhesive (or grammage) which is also controlled, generally not exceeding 10 g/m². This coating stage is followed by stage of laminating a second layer of material, identical to or different from the first, consisting of the application, under pressure, of this second layer of material to the first layer of material covered with the layer of adhesive.

Two-component polyurethane-based adhesive compositions are commonly used for this type of application.

These compositions are supplied to the laminator in the form of 2 compositions (or components):
  one (known as —NCO component) containing chemical entities carrying isocyanate end groups, and
  the other (known as —OH component) containing chemical entities carrying hydroxyl end groups.

The mixing of these 2 components is carried out under hot conditions at a temperature of between 35 and 80° C. by the operator of the lamination machine, prior to starting it up, and makes possible, by virtue of an appropriate viscosity, the correct operation of the machine.

On conclusion of the coating of the mixture thus obtained and of the laminating operation, the isocyanate groups of the —NCO component react with the hydroxyl groups of the —OH component, according to a reaction referred to as crosslinking, to form a polyurethane which exists in the form of a three-dimensional network comprising urethane groups, providing the cohesion of the adhesive seal between the 2 thin laminated layers. The time required to complete this crosslinking reaction and to thus ensure the required level of cohesion is generally of the order of 1 to 30 days.

The chemical entities present in the —NCO component are generally polymeric chemical compounds carrying isocyanate end groups (often known as prepolymers as they are precursors of the constituent final crosslinked polyurethane of the adhesive seal), which are themselves generally polyurethanes produced by the reaction of a stoichiometric excess of at least one diisocyanate with at least one polyether polyol and/or polyester polyol.

The chemical entities present in the —OH component are generally polymeric or non-polymeric compounds, sometimes of natural origin (such as castor oil), which generally include polymers of polyether polyol and/or polyester polyol type, with a number-average molecular weight Mn (or molar mass) ranging from 400 to 4000 g/mol.

However, these polyurethane-based adhesive compositions generally exhibit the disadvantage of employing an —NCO component comprising high residual contents of diisocyanate monomers originating from the reaction for the synthesis of the polyurethane prepolymer carrying NCO groups (or having NCO endings). This is because these residual diisocyanate monomers are capable of resulting in a number of undesirable effects.

"Diisocyanate monomer" is understood to mean a hydrocarbon compound of low molar mass (of less than 300 g/mol) having two isocyanate groups. In particular, "aromatic diisocyanate monomer" is understood to mean a diisocyanate monomer as defined above, in which one of the NCO groups is connected via a covalent bond to a carbon atom forming part of an aromatic hydrocarbon ring, such as a phenyl group. In particular, "aliphatic diisocyanate monomer" is understood to mean a nonaromatic diisocyanate monomer or a diisocyanate monomer in which none of the NCO groups is connected via a covalent bond to a carbon atom forming part of an aromatic hydrocarbon ring, such as a phenyl group.

The disadvantage of aromatic diisocyanate monomers, such as toluene diisocyanate (TDI) or diphenylmethane diisocyanate (MDI), is that they are capable of migrating through the packaging and of forming, by hydrolysis on contact with water or with moisture present in the foods or other packaged products, primary aromatic amines regarded as toxic.

Aliphatic diisocyanate monomers, such as isophorone diisocyanate (IPDI), can also present health problems, being classified as sensitizing.

In addition, some diisocyanate monomers can generate emissions which are toxic to living beings. These vapors can be released at ambient temperature for the most volatile monomers or under hot conditions when the adhesive composition is subjected to high temperatures.

In order to take into account the undesirable effects related to the presence of these diisocyanate monomers, regulations require, for some types of products, in particular in the food field, a specific labelling of the product, if the concentration of aromatic diisocyanate monomers exceeds 0.1% by weight of the weight of the product and/or if the concentration of aliphatic diisocyanate monomers exceeds 0.5% by weight of the weight of the product.

It is thus desirable to make available to the public two-component adhesive compositions in which the —NCO component, based on polyurethane having NCO endings, is substantially, indeed even completely, devoid of residual diisocyanate monomers and preferably in which the content of residual diisocyanate monomers is less than or equal to the abovementioned regulatory thresholds.

The application U.S. Pat. No. 7,129,312 (Henkel KGAA) describes an adhesive composition based on polyurethane having NCO endings, in which the polyurethane having NCO endings is obtained by reaction:
  of at least one polyol, with a number-average molecular weight Mn ranging from 400 to 20 000, with
  a composition essentially comprising a polyurethane prepolymer having NCO endings obtained by reaction of a stoichiometric excess of at least diisocyanate monomer, with a molar mass of less than or equal to 500, with a diol, other than the abovementioned diol, with a number-average molecular weight Mn of less than or equal to 2000,
  in which composition the amount of unreacted diisocyanate monomers has been reduced in postsynthesis of the polyurethane prepolymer having NCO endings by removal of these monomers or separation of these monomers from said prepolymer.

The adhesive composition can additionally comprise at least one triisocyanate which is capable of migrating and which has a lower saturated vapor pressure than MDI (diphenylmethane diisocyanate). This adhesion promoter can be added either during the synthesis of the polyurethane prepolymer, or immediately in postsynthesis of the polyurethane prepolymer, or subsequently during the formulation of the adhesive composition, for example after mixing the —NCO and —OH components.

However, these adhesive compositions are not entirely satisfactory and remain to be improved with regard to a number of points, in particular from the viewpoint of their adhesive performance qualities for the adhesive bonding of metal material.

This is because it has been observed that these compositions were not suitable for the adhesive bonding of metal materials, due to an insufficient level of cohesion, and were in fact not suitable for manufacturing multilayer structures of flexible packagings based on metal materials.

In addition, the process for the preparation of the adhesive compositions of the prior art is restrictive as it requires in particular the use of an additional stage intended to remove or reduce the excess of unreacted diisocyanate monomers, which has to be modified according to the type of diisocyanate monomers to be removed. This is because, in the composition described, the amount of unreacted diisocyanate monomers is reduced after synthesis of the polyurethane prepolymer by separating the unreacted diisocyanate monomers from the latter, either by precipitation of the prepolymer in the presence of solvent, followed by filtration or centrifugation, or by selective extraction of the monomers, for example using supercritical $CO_2$ or a solvent, or by distillation of these monomers, for example under reduced pressure, depending on the nature of the monomers to be removed.

Furthermore, the use of a significant amount of solvent in the adhesive compositions is not very desirable as this results in a low-rate lamination process which is not very compact and which is potentially more dangerous in the case of a flammable and volatile solvent.

Thus, there exists a need to develop a polyurethane-based adhesive composition which does not exhibit the disadvantages of the abovementioned prior art and which is suitable for the manufacture of a broad range of multilayer structures, in particular those comprising at least one layer of metal material, and which can be used for the manufacture of flexible packagings.

In particular, the aim is to develop a polyurethane-based adhesive composition which is simple to prepare and easy to employ by a conventional industrial laminating process, which can be employed at a temperature of less than or equal to 60° C. and preferably of less than or equal to 50° C. and which is sufficiently stable thermally to be employed in a laminating process.

More particularly, the aim is to develop a polyurethane-based adhesive composition which is substantially or completely devoid of solvent and of residual diisocyanate monomers and exhibits excellent adhesive performance qualities, thus making it possible to manufacture multilayer structures intended for the packaging of various products in the food field, which structures are or are not intended to undergo a heat treatment, such as a pasteurization or a sterilization.

It has now been found that the adhesive composition which is a subject matter of the present patent application makes it possible to meet its needs.

In particular, the adhesive composition according to the invention makes it possible to manufacture, with an excellent level of cohesion, different types of laminates which can be used in the manufacture of flexible packagings, including those based on metal materials.

In particular, the process for the preparation of the polyurethane prepolymer according to the invention makes it possible to prepare an adhesive composition substantially or completely devoid of solvent and of residual diisocyanate monomers in a reduced number of stages, with respect to the prior art. This is because the process for the preparation of the polyurethane prepolymer according to the invention does not require that an additional stage of separation or of removal of solvent and/or of excess diisocyanate monomer be carried out after the synthesis of said prepolymer.

In particular, the adhesive composition according to the invention exhibits a content of diisocyanate monomer which is low enough to be able to be used to manufacture multilayer structures intended for the packaging of foodstuffs, cosmetic products, pharmaceutical products or body hygiene products.

In particular, the adhesive composition according to the invention exhibits a suitable viscosity and is sufficiently stable to be employed in conventional industrial lamination processes at temperatures ranging from 40° C. to 60° C. and preferably equal to approximately 50° C.

In particular, the adhesive composition according to the invention also makes it possible to obtain a multilayer structure which is resistant to a high-temperature heat treatment ranging from 60° C. to 135° C., such as a pasteurization (70° C. to 99° C.) and better still a sterilization (100° C. to 135° C.).

The level of cohesion and the thermal resistance of the adhesive compositions can be evaluated in a way well known to a person skilled in the art, as illustrated in the examples.

SUMMARY OF THE INVENTION

A first subject matter of the invention relates to a two-component polyurethane-based adhesive composition comprising an —NCO component and an —OH component, such that:
the —NCO component is a composition comprising:
A) at least one polyurethane prepolymer comprising at least two NCO end groups obtained by a polyaddition reaction:
of at least one asymmetric diisocyanate monomer and
of at least one diol,
B) at least one triisocyanate chosen from isocyanurates, biurets, adducts of diisocyanates and of triols, and their mixtures,
the —OH component is a composition comprising at least one polyol,
at least one of the polyols or diols is chosen from polyether polyols (or polyether diols),
at least one of the polyols or diols is chosen from polyester polyols (or polyester diols), and
the ratio by weight of the amount of polyether polyol(s) to the amount of polyester polyol(s), denoted $r_4$, ranges from 0.6 to 2.2, preferably from 0.7 to 2.0.

According to one embodiment, the polyurethane prepolymer having NCO endings used according to the invention is obtained by a polyaddition reaction:
of at least one asymmetric diisocyanate monomer chosen from:
isophorone diisocyanate (IPDI),
2,4-toluene diisocyanate (2,4-TDI) and its hydrogenated form,
2,4'-diphenylmethane diisocyanate (2,4'-MDI) and its hydrogenated form,
and their mixtures, and
of at least one diol chosen from mixtures of polyether diol(s) and of polyester diol(s), in the presence or absence of at least one reaction catalyst, at a reaction temperature T1 of less than 95° C. and preferably ranging from 65° C. to 80° C., under anhydrous conditions, and in amounts of diisocyanate monomer(s) and of diol(s) resulting in an NCO/OH molar ratio, denoted $r_1$, ranging from 1.5 to 2.5.

This ratio $r_1$ corresponds to the ratio of the number of —NCO groups (present in the total amount of diisocyanate monomer(s) used to synthesize the polyurethane prepolymer having NCO endings) to the number of —OH groups (present in the total amount of diol(s) used to synthesize the polyurethane prepolymer having NCO endings).

According to one embodiment, the —NCO component comprises a content of aliphatic diisocyanate monomer(s) of less than or equal to 0.5% by weight, with respect to the weight of the —NCO component, and a content of aromatic diisocyanate monomer(s) of less than or equal to 0.1% by weight, with respect to the weight of the —NCO component.

According to one embodiment, the —NCO and —OH components, which are intended to be mixed, are present in the two-component adhesive composition according to the invention in amounts such that the NCO/OH molar ratio, denoted $r_3$, ranges from 1 to 2.5, more preferably from 1.2 to 1.9.

This ratio $r_3$ corresponds to the ratio of the number of NCO groups present in the total amount of NCO component intended to be mixed to the number of OH groups present in the total amount of OH component intended to be mixed.

According to one embodiment, the molar ratio of the number of NCO groups present in the total amount of diisocyanate monomer(s) used for the synthesis of the polyurethane prepolymer having NCO endings A) to the number of NCO groups present in the total amount of triisocyanate(s) B) present in the —NCO component, denoted $r_2$, preferably ranges from 3 to 8.5, more preferably from 3 to 7, more preferably still from 3 to 5 and better still from 3 to 4.

Another subject matter of the invention is a multilayer structure comprising at least two layers of material bonded together by an adhesive layer, characterized in that said adhesive layer consists of the adhesive composition according to the invention in the crosslinked state.

Another subject matter of the invention is a process for the manufacture of a multilayer structure according to the invention, comprising the following stages:
(i) the mixing of the —NCO and —OH components at an appropriate temperature, preferably at a temperature of less than or equal to 60° C., more preferably of less than or equal to 50° C., then
(ii) the coating of said mixture over the surface of a first layer of material, then
(iii) the laminating of the surface of a second layer of material over said coated surface, then
(iv) the crosslinking of said mixture.

Another subject matter of the invention is the use of a multilayer structure according to the invention in the manufacture of flexible packagings and in particular of heat-sealable, sterilizable and/or pasteurizable flexible packagings.

Other subject matters and characteristics of the present invention will become more clearly apparent on reading the description and the examples.

DETAILED DESCRIPTION OF THE EMBODIMENTS OF THE INVENTION

In the present patent application, unless otherwise indicated:
the amounts expressed in the percentage form correspond to weight/weight percentages;

the number-average molecular weights (Mn), expressed in grams per mole (g/mol), are determined by calculation by the analysis of the content of (NCO or OH) end groups, expressed in milliequivalents per gram (meq/g), and the functionality (number of NCO or OH groups per mole) of the entity under consideration (polyurethane prepolymer having NCO endings, diol or polyol);

"asymmetric diisocyanate monomer" is understood to mean a diisocyanate monomer, the isocyanate groups of which have different reactivities from the viewpoint of a given diol. As a general rule, such a monomer does not have an axis, plane or center of symmetry.

"polyol" is intended to denote any linear or branched, cyclic or acyclic, saturated or unsaturated, aromatic or aliphatic, hydrocarbon compound comprising at least two hydroxyl (OH) groups (or functional groups) and optionally one or more divalent groups chosen from ether (—O—) and carboxyl (—C(=O)O— or —OC(=O)—) groups.

"diol" is intended to denote a polyol as defined above comprising two hydroxyl (OH) groups (or functional groups), "triol" is intended to denote a polyol as defined above comprising three hydroxyl (OH) groups (or functional groups), the hydroxyl number of a polyol (denoted OHN) represents the number of hydroxyl functional groups per gram of polyol and is expressed in the text of the present patent application in the form of the equivalent number of milligrams of potassium hydroxide (KOH) which are used in the quantitative determination of the hydroxyl functional groups. The OHN can be measured experimentally, for example according to the standard ISO 14900:2001. In the case of a mixture of polyols, the OHN can also be calculated from the known OHN values of each of the polyols and from their respective contents by weight in said mixture.

the content of diisocyanate monomer is measured according to the following analytical method, which is based on the specific reaction of the isocyanate NCO group with an amine (1-(2-methoxyphenyl)piperazine or PPZ) to form stable urea derivatives. These derivatives are obtained during the preparation of the adhesive sample by dilution/dissolution of this sample using a 0.02 mol/l solution of PPZ in acetonitrile. The PZZ derivatives formed from the isocyanates present in the sample to be analyzed are subsequently quantitatively determined by a reversed-phase C18 High Performance Liquid Chromatography (HPLC) system with a mobile phase gradient comprising a mixture of water and acetonitrile buffered using a 0.2% by weight aqueous tetrabutylammonium bisulfate solution, at a pH ranging from 2 to 3, provided with an Ultra-Violet (UV) detector operating at 254 nm. These compounds are identified and quantified by comparing their retention times and their surface areas of chromatographic peaks with those of the standard PPZ derivatives obtained by reaction of a diisocyanate monomer of known nature and concentration.

the viscosity is measured using a Brookfield viscometer.

the various embodiments described in the present patent application can be combined with one another.

Two-Component Adhesive Composition:

The present invention relates to a two-component polyurethane-based adhesive composition comprising an —NCO component and an —OH component, such that:

the —NCO component is a composition comprising:

A) at least one polyurethane prepolymer comprising at least two NCO end groups, said prepolymer being obtained by a polyaddition reaction:
of at least one asymmetric diisocyanate monomer and
of at least one diol, B) at least one triisocyanate chosen from isocyanurates, biurets, adducts of diisocyanates and of triols, and their mixtures, the —OH component is a composition comprising at least one polyol, at least one of the polyols or diols is chosen from polyether polyols (or polyether diols), at least one of the polyols or diols is chosen from polyester polyols (or polyester diols), and the ratio by weight of the amount of polyether polyol(s) to the amount of polyester polyol(s), denoted $r_4$, ranges from 0.6 to 2.2, preferably from 0.7 to 2.0.

—Nco Component:

A) Polyurethane Prepolymer Having NCO Endings

The polyurethane prepolymer having NCO endings used according to the invention can represent from 70% 95% by weight of the —NCO component, preferably from 75% to 90% by weight, with respect to the total weight of the —NCO component.

The asymmetric diisocyanate monomer(s) which can be used to prepare the polyurethane prepolymer having NCO endings A) used according to the invention can be aliphatic or aromatic.

Preferably, the asymmetric diisocyanate monomer(s) is (are) chosen from the following diisocyanates and their mixture:

isophorone diisocyanate (IPDI), 2,4-toluene diisocyanate (2,4-TDI) and its hydrogenated form, 2,4'-diphenylmethane diisocyanate (2,4'-MDI) and its hydrogenated form.

In particular, it (they) can be used in the form of a composition of diisocyanates comprising at least 90% by weight and preferably at least 95% by weight, with respect to the weight of said composition, of an asymmetric diisocyanate monomer.

More preferably, the asymmetric diisocyanate monomer(s) is (are) chosen from the 2,4'-MDI isomer, the 2,4-TDI isomer, a mixture of MDI isomers comprising 90% by weight at least and preferably comprising 95% by weight at least of 2,4'-MDI isomer, or a mixture of TDI isomers comprising 90% by weight at least and preferably comprising 95% by weight at least of 2,4-TDI isomer, said percentages being expressed respectively with respect to the weight of the mixture of isomers.

The asymmetric diisocyanate monomer(s) which can be used to prepare the polyurethane prepolymer having NCO endings A) used according to the invention is (are) commercially available.

The diol(s) which can be used to prepare the polyurethane prepolymer having NCO endings A) used according to the invention is (are) preferably chosen from polyether diols, polyester diols and their mixtures, and more preferably from mixtures of polyether diol(s) and of polyester diol(s).

The mixtures of polyether diol(s) and of polyester diol(s) can be:

a mixture of polyether diols of different natures with a polyester diol;

a mixture of polyether diols of different natures with a mixture of polyester diols of different natures; or a polyether diol with a mixture of polyester diols of different natures.

The diol(s) which can be used to prepare the polyurethane prepolymer having NCO endings A) used according to the invention can be chosen from those, the number-average molecular weight Mn of which is less than or equal to 4000 g/mol, preferably from those, the number-average molecular weight Mn of which is strictly less than 2000 g/mol, and more preferably those, the number-average molecular weight Mn of which ranges from 400 to 1500 g/mol.

Preferably, the diol(s) which can be used to prepare the polyurethane prepolymer having NCO endings A) used according to the invention exhibit(s) a hydroxyl number (OHN) ranging from 28 to 281 mg KOH/g.

The polyether diol(s) which can be used to prepare the polyurethane prepolymer having NCO endings A) used according to the invention is (are) preferably chosen from polyoxyalkylene diols, the (saturated) linear or branched alkylene part of which comprises from 2 to 4 carbon atoms and preferably from 2 to 3 carbon atoms.

Preferably, the polyether diol(s) which can be used to prepare the polyurethane prepolymer having NCO endings A) is (are) chosen from polyoxypropylene diols having a polydispersity index ranging from 1 to 1.4, in particular ranging from 1 to 1.3. This index corresponds to the ratio of the weight-average molecular weight Mw to the number-average molecular weight Mn of the polyether polyol (PI=Mw/Mn), determined by GPC.

Preferably, the polyether diol(s) which can be used to prepare the polyurethane prepolymer having NCO endings A) has (have) an OHN ranging from 50 to 281 mg KOH/g.

The abovementioned polyether diol(s) can be prepared in a conventional manner and/or is (are) widely available commercially, as illustrated in the examples.

The polyester diol(s) which can be used to prepare the polyurethane prepolymer having NCO endings A) used according to the invention can be chosen from:
  polyester diols resulting from the polycondensation of at least one dicarboxylic acid, or of at least one of its corresponding anhydrides or diesters, with at least one diol,
  polyester diols resulting from a polymerization with ring opening of at least one cyclic lactone with at least diol, such as polycaprolactone polyols.

The dicarboxylic acid(s) which can be used for the synthesis of the abovementioned polyester diols are linear or branched, cyclic or acyclic, saturated or unsaturated and aromatic or aliphatic and preferably comprise from 3 to 40 carbon atoms and more preferably from 6 to 10 carbon atoms.

The diol(s) which can be used for the synthesis of the abovementioned polyester diols can be chosen from polyalkylene diols, polyoxyalkylene diols and the mixtures of these compounds, the alkylene (saturated) part of these compounds preferably being linear or branched and preferably comprising from 2 to 40 carbon atoms and more preferably from 2 to 8 carbon atoms.

The cyclic lactone(s) which can be used for the synthesis of the abovementioned polyester diols preferably comprise from 3 to 7 carbon atoms.

Preferably, the polyester diol(s) which can be used to prepare the polyurethane prepolymer having NCO endings A) used according to the invention has (have) an OHN ranging from 90 to 281 mg KOH/g, preferably from 90 to 280 mg KOH/g.

Preferably, the polyester diol(s) which can be used to prepare the polyurethane prepolymer having NCO endings A) used according to the invention has (have) an OHN ranging from 90 to 150 mg KOH/g.

The polyester diol(s) which can be used to prepare the polyurethane prepolymer having NCO endings A) used according to the invention can be prepared in a conventional manner and/or is (are) widely available commercially, as illustrated in the examples.

The diol(s) which can be used to prepare the polyurethane prepolymer having NCO endings A) used according to the invention can be used as polyol(s) which can be used in the —OH component.

According to one embodiment, the polyurethane prepolymer having NCO endings A) is obtained:
  from a polyoxyalkylene diol, the (saturated) linear or branched alkylene part of which comprises from 2 to 4 carbon atoms and preferably from 2 to 3 carbon atoms, said polyoxyalkylene diol preferably having an OHN ranging from 50 to 281 mg KOH/g;
  from a mixture of polyoxyalkylene diols, the (saturated) linear or branched alkylene part of which comprises from 2 to 4 carbon atoms and preferably from 2 to 3 carbon atoms, said polyoxyalkylene diols preferably having an OHN ranging from 50 to 281 mg KOH/g;
  from a mixture of:
    polyester diol(s) as defined above and having in particular an OHN ranging from 90 to 281 mg KOH/g, preferably from 90 to 150 mg KOH/g; and
    polyoxyalkylene diol(s), the (saturated) linear or branched alkylene part of which comprises from 2 to 4 carbon atoms and preferably from 2 to 3 carbon atoms, said polyoxyalkylene diol(s) preferably having an OHN ranging from 50 to 281 mg KOH/g;
  from a polyester diol as defined above and having in particular an OHN ranging from 90 to 281 mg KOH/g, preferably from 90 to 150 mg KOH/g; or
  from a mixture of polyester diols as defined above and having in particular an OHN ranging from 90 to 281 mg KOH/g, preferably from 90 to 150 mg KOH/g.

Preferably, the amounts of asymmetric diisocyanate monomer(s) and of diol(s) used in the synthesis of the polyurethane prepolymer having NCO endings A) are such that the NCO/OH molar ratio, denoted $r_1$, ranges from 1.5 to 2.5, more preferably from 1.6 to 2.4.

The amounts by weight of asymmetric diisocyanate monomer(s) and of diol(s) to be charged to the reactor are determined on the basis of this ratio and also the hydroxyl number OHN of the diol or mixture of diols, measured experimentally or calculated from the OHN values of the diols present and from their respective contents by weight in said mixture.

The polyurethane prepolymer having NCO endings A) as defined above can be prepared in the presence or absence of at least one reaction catalyst, at a reaction temperature T1 of less than 95° C. and preferably ranging from 65° C. to 80° C., under anhydrous conditions.

The combined conditions for obtaining the polyurethane prepolymer having NCO endings A) which are described above make it possible to obtain a concentration of unreacted diisocyanate monomer(s) which is low enough at the end of the reaction for the polyurethane prepolymer having NCO endings A) to be able to be used directly after its synthesis in the preparation of the —NCO component, without it being necessary to treat it, for example by purification, distillation or selective extraction processes as employed in the prior art, in order to remove or reduce the excess of unreacted diisocyanate monomer(s) present in the reaction product.

The —NCO component obtained can thus comprise a content of aliphatic diisocyanate monomer(s) of less than or equal to 0.5% by weight, with respect to the weight of the —NCO component, and a content of aromatic diisocyanate monomer(s) of less than or equal to 0.1% by weight, with respect to the weight of the —NCO component.

Preferably, the —NCO component does not comprise a solvent, it being possible for said solvent to be an organic solvent, such as ethyl acetate, methyl ethyl ketone, tetrahydrofuran, methyltetrahydrofuran, or else from Isane® (based on isoparaffins, available from Total) or Exxol® D80 (based on aliphatic hydrocarbons, available from ExxonMobil Chemical) or else chlorobenzene, naphtha, acetone, n-heptane or xylene.

B) Triisocyanate

The —NCO component comprises at least one triisocyanate chosen from isocyanurates, biurets, adducts of diisocyanates and of triols, and their mixtures.

In particular, the isocyanurate(s) can be used in the form of an industrial mixture of (poly)isocyanurate(s) with a purity of greater than or equal to 70% by weight of isocyanurate(s), with respect to the weight of said mixture.

Preferably, the diisocyanate isocyanurate(s) which can be used according to the invention correspond(s) to the following general formula (I):

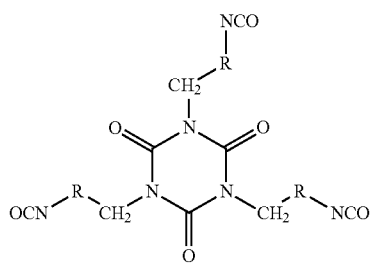

(I)

in which:

R represents a linear, branched or cyclic and aliphatic or aromatic alkylene group comprising from 4 to 9 carbon atoms, with the proviso that the NCO groups are not connected via a covalent bond to a carbon atom forming part of an aromatic hydrocarbon ring, such as a phenyl group.

Mention be made, as examples of diisocyanate trimers which can be used according to the invention, of:

the isocyanurate trimer of hexamethylene diisocyanate (HDI)

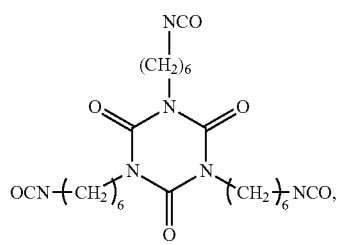

the isocyanurate trimer of isophorone diisocyanate (IPDI)

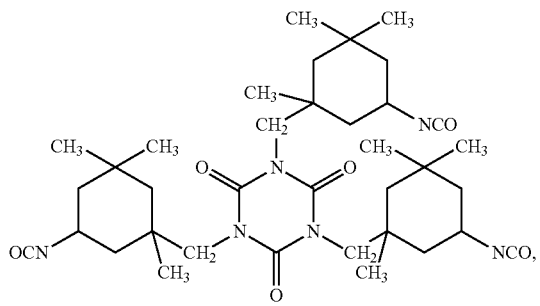

the isocyanurate trimer of pentamethylene diisocyanate (PDI)

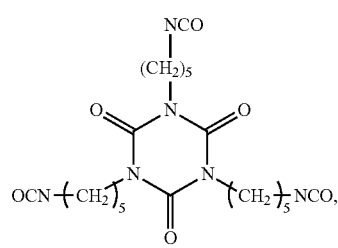

the isocyanurate trimer of meta-xylene diisocyanate (m-XDI)

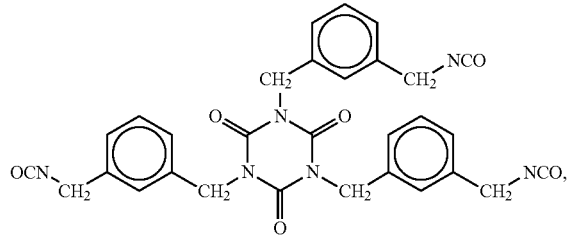

the isocyanurate trimer of m-XDI, in the hydrogenated form

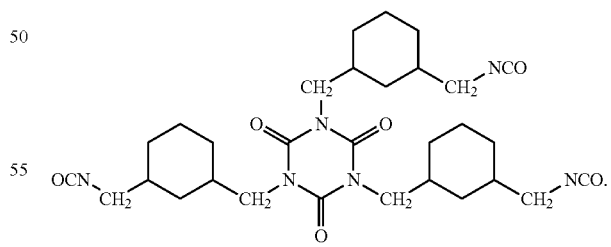

The diisocyanate(s) which can be used to prepare the adducts of diisocyanate and triol is (are) preferably chosen from aromatic or aliphatic diisocyanate monomers and their mixtures and more preferably aliphatic diisocyanate monomers. The diisocyanate monomer(s) can be in the form of a pure isomer or in the form of a mixture of isomers.

Mention may be made, as triols which can be used to prepare the adducts of diisocyanate and triol, for example, of Glycerol, Trimethylolmethane (TMM), Trimethylolethane (TME) and Trimethylolpropane (TMP). Preferably, TMP is used.

Mention may be made, by way of example of adducts of diisocyanates and of triols which can be used according to the invention, of the adduct of meta-xylene diisocyanate and of trimethylolpropane, as represented below.

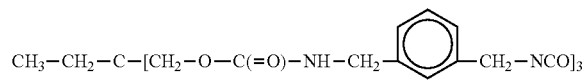

Preferably, the amounts of diisocyanate monomer(s) used in the synthesis of the polyurethane prepolymer having NCO endings A) and of triisocyanate(s) present in the —NCO component are such that the ratio $r_2$ preferably ranges from 3 to 8.5.

More preferably, the ratio $r_2$ ranges from 3 to 7, more preferably still the ratio $r_2$ ranges from 3 to 5 and better still it ranges from 3 to 4.

The content of NCO groups (denoted meq NCO/100 g) of the —NCO component ranges from 200 to 300 meq NCO/100 g, preferably from 220 to 280 meq NCO/100 g of the —NCO component and better still from 235 to 265 meq NCO/100 g of the —NCO component.

The —NCO component is generally prepared by simple mixing of its ingredients at a temperature of less than or equal to 85° C. and preferably ranging from 60° C. to 80° C., under anhydrous conditions.

—Oh Component:

The polyol(s) used according to the invention can represent from 85% to 100% by weight of the weight of the —OH component, preferably from 95% to 100% by weight of the weight of the —OH component.

Use may be made, as polyols which can be used in the —OH component, of any polyol normally used in the field of two-component lamination adhesives.

Preferably, the polyol(s) which can be used in the —OH component exhibit(s) a hydroxyl number (OHN) ranging from 28 to 1057 mg KOH/g.

In particular, the polyol(s) which can be used in the —OH component can be chosen from diols, triols and their mixtures.

In particular, the polyol(s) which can be used in the —OH component can be chosen from polyether polyols, polyester polyols, polyurethane prepolymers comprising at least two OH groups, and the mixtures of these, and preferably from polyether polyols, polyester polyols and their mixtures.

Preferably, the polyol(s) which can be used in the —OH component is (are) linear or branched and saturated or unsaturated.

Preferably, the polyol(s) which can be used in the —OH component is (are) preferably chosen from:
  the diols which can be used to prepare the polyurethane prepolymer having NCO endings A) used according to the invention and in particular the polyether diols and the polyester diols as described above,
  polyether triols and polyalkylene triols, such as polyoxyalkylene triols and polyalkylene triols, the (saturated), preferably linear or branched, alkylene part of which comprises from 2 to 4 carbon atoms and more preferably from 2 to 3 carbon atoms,
  polyester triols of natural origin, such as castor oil, and their mixtures.

Castor oil is a vegetable oil which is obtained from the seeds of the castor oil plant and consists of triglycerides (triple esters of glycerol and of fatty acids), said fatty acids comprising, for approximately 90% by weight, a hydroxylated monounsaturated C18 fatty acid: ricinoleic acid.

Use may be made, as polyurethane prepolymers having OH endings (carrying hydroxyl end groups) which can be used in the —OH component, of those obtained by a polyaddition reaction of at least one diol(s) with at least one diisocyanate(s), in a stoichiometric excess of diol(s), with respect to the diisocyanate(s), resulting in the complete functionalization of the isocyanate (NCO) groups by the hydroxyl (OH) groups. According to one embodiment, the polyurethane prepolymer having OH endings is prepared in situ in the OH component by mixing diisocyanate(s) and diol(s) in suitable proportions, resulting in the complete functionalization of the isocyanate (NCO) groups by the hydroxyl (OH) groups.

Preferably, the amount of polyol(s) used in the —OH component is such that the content of OH groups of the —OH component ranges from 250 to 430 meq OH/100 g, preferably from 280 to 400 meq OH/100 g of —OH component and better still from 300 to 380 meq OH/100 g of —OH component.

Preferably, the polyol of the —OH component is chosen from the group consisting of polyether diols, such as, for example, polyoxyalkylene diols, the saturated, preferably linear or branched, alkylene part of which comprises from 2 to 4 carbon atoms and more preferably from 2 to 3 carbon atoms; polyester diols; polyether triols, such as, for example, polyoxyalkylene triols, the saturated, preferably linear or branched, alkylene part of which comprises from 2 to 4 carbon atoms and more preferably from 2 to 3 carbon atoms; polyalkylene triols, preferably polyalkylene triols, the saturated, preferably linear or branched, alkylene part of which comprises from 2 to 4 carbon atoms and more preferably from 2 to 3 carbon atoms; polyester triols, in particular of natural origin, such as, for example, castor oil; and of their mixtures.

According to a preferred embodiment, the —OH component comprises:
  at least one polyether triol, at least one polyether diol and at least one polyester diol (preferably a mixture of polyester diols);
  at least one polyester triol, preferably of natural origin, such as castor oil, and at least one polyether triol;
  at least one polyether triol and at least one polyester diol;
  at least one polyether triol, at least one polyether diol and at least one polyester diol;
  at least one polyether triol and at least one polyester triol;
  at least one polyester triol, preferably of natural origin, at least one polyether diol and at least one polyester diol;
the polyether diol(s) preferably being chosen from polyoxyalkylene diols, the (saturated), preferably linear or branched, alkylene part of which comprises from 2 to 4 carbon atoms and more preferably from 2 to 3 carbon atoms; and
the polyether triol(s) preferably being chosen from polyoxyalkylene triols, the (saturated), preferably linear or branched, alkylene part of which comprises from 2 to 4 carbon atoms and more preferably from 2 to 3 carbon atoms.

The two-component polyurethane-based adhesive composition according to the invention can be such that the —NCO component can be obtained from any diol (or combination of diols) as defined above and that the —OH component can comprise any type of polyol (or combination of polyols) as defined above, provided that:

at least one of the polyols or diols is chosen from polyether polyols (or polyether diols), at least one of the polyols or diols is chosen from polyester polyols (or polyester diols), and the ratio by weight of the amount of polyether polyol(s) to the amount of polyester polyol(s), denoted $r_4$, ranges from 0.6 to 2.2, preferably from 0.7 to 2.0.

According to one embodiment, the two-component adhesive composition according to the invention is such that:

the —NCO component is a composition comprising:
A) at least one polyurethane prepolymer comprising at least two NCO end groups, said prepolymer being obtained by a polyaddition reaction:
of at least one asymmetric diisocyanate monomer as defined above; and
of at least one diol chosen from polyether diols, polyester diols and their mixtures, preferably of a mixture of polyether diol(s) and of polyester diol(s), the polyether diol(s) preferably being chosen from polyoxyalkylene diols, the (saturated), linear or branched, alkylene part of which comprises from 2 to 4 carbon atoms and preferably from 2 to 3 carbon atoms;
B) at least one triisocyanate chosen from isocyanurates, biurets, adducts of diisocyanates and of triols, and their mixtures, the —OH component is a composition comprising at least one polyol chosen from diols, triols and their mixtures.

Preferably, the two-component adhesive composition according to the invention is such that:

the —NCO component is a composition comprising:
A) at least one polyurethane prepolymer comprising at least two NCO end groups, said prepolymer being obtained by a polyaddition reaction:
of at least one asymmetric diisocyanate monomer as defined above; and
of at least one diol chosen from polyether diols, polyester diols and their mixtures, preferably of a mixture of polyether diol(s) and of polyester diol(s), the polyether diol(s) preferably being chosen from polyoxyalkylene diols, the (saturated), linear or branched, alkylene part of which comprises from 2 to 4 carbon atoms and preferably from 2 to 3 carbon atoms;
B) at least one triisocyanate chosen from isocyanurates, biurets, adducts of diisocyanates and of triols, and their mixtures, the —OH component is a composition comprising at least one polyol chosen from polyether polyols, polyester polyols, polyurethane prepolymers comprising at least two OH groups, and their mixtures, and preferably from polyether polyols, polyester polyols and their mixtures.

Preferably, the two-component adhesive composition according to the invention is such that:

the —NCO component is a composition comprising:
A) at least one polyurethane prepolymer comprising at least two NCO end groups, said prepolymer being obtained by a polyaddition reaction:
of at least one asymmetric diisocyanate monomer as defined above; and
of at least one diol chosen from polyether diols, polyester diols and their mixtures, preferably of a mixture of polyether diol(s) and of polyester diol(s), the polyether diol(s) preferably being chosen from polyoxyalkylene diols, the (saturated), linear or branched, alkylene part of which comprises from 2 to 4 carbon atoms and preferably from 2 to 3 carbon atoms;
B) at least one triisocyanate chosen from isocyanurates, biurets, adducts of diisocyanates and of triols, and their mixtures, the —OH component is a composition comprising at least one polyol chosen from polyether diols; polyester diols; polyether triols, such as, for example, polyoxyalkylene triols, the (saturated), preferably linear or branched, alkylene part of which comprises from 2 to 4 carbon atoms and more preferably from 2 to 3 carbon atoms; polyalkylene triols, preferably polyalkylene triols, the (saturated), preferably linear or branched, alkylene part of which comprises from 2 to 4 carbon atoms and more preferably from 2 to 3 carbon atoms; polyester triols, preferably of natural origin, such as, for example, castor oil; and their mixtures.

Preferably, the two-component adhesive composition according to the invention is such that:

the —NCO component is a composition comprising:
A) at least one polyurethane prepolymer comprising at least two NCO end groups, said prepolymer being obtained by a polyaddition reaction:
of at least one asymmetric diisocyanate monomer as defined above; and
of a mixture of polyether diol(s) and of polyester diol(s), the polyether diol(s) preferably being chosen from polyoxyalkylene diols, the (saturated), linear or branched, alkylene part of which comprises from 2 to 4 carbon atoms and preferably from 2 to 3 carbon atoms;
B) at least one triisocyanate chosen from isocyanurates, biurets, adducts of diisocyanates and of triols, and their mixtures, the —OH component is a composition comprising a mixture of polyether triol(s), of polyether diol(s) and of polyester diol(s).

Preferably, the two-component adhesive composition according to the invention is such that:

the —NCO component is a composition comprising:
A) at least one polyurethane prepolymer comprising at least two NCO end groups, said prepolymer being obtained by a polyaddition reaction:
of at least one asymmetric diisocyanate monomer as defined above; and
of a mixture of polyester diols,
B) at least one triisocyanate chosen from isocyanurates, biurets, adducts of diisocyanates and of triols, and their mixtures, the —OH component is a composition comprising a mixture of polyester triol(s) (preferably of natural origin), of polyether diol(s) and of polyester diol(s).

Preferably, the two-component adhesive composition according to the invention is such that:

the —NCO component is a composition comprising:
A) at least one polyurethane prepolymer comprising at least two NCO end groups, said prepolymer being obtained by a polyaddition reaction:
of at least one asymmetric diisocyanate monomer as defined above; and
of a mixture of polyether diol(s) and of polyester diol(s), the polyether diol(s) preferably being chosen from polyoxyalkylene diols, the (saturated), linear or branched, alkylene part of which comprises from 2 to 4 carbon atoms and preferably from 2 to 3 carbon atoms;

B) at least one triisocyanate chosen from isocyanurates, biurets, adducts of diisocyanates and of triols, and their mixtures, the —OH component is a composition comprising a mixture of polyester triol(s) and of polyether triol(s).

Preferably, the two-component adhesive composition according to the invention is such that:

the —NCO component is a composition comprising:
A) at least one polyurethane prepolymer comprising at least two NCO end groups, said prepolymer being obtained by a polyaddition reaction:
of at least one asymmetric diisocyanate monomer and
of a mixture of polyether diol(s) and of polyester diol(s), the polyether diol(s) preferably being chosen from polyoxyalkylene diols, the (saturated), linear or branched, alkylene part of which comprises from 2 to 4 carbon atoms and preferably from 2 to 3 carbon atoms;
B) at least one triisocyanate chosen from isocyanurates, biurets, adducts of diisocyanates and of triols, and their mixtures, the —OH component is a composition comprising a mixture of polyether triol(s), of polyester diol(s) and optionally of polyether diol(s).

Preferably, the two-component adhesive composition according to the invention is such that:

the —NCO component is a composition comprising:
A) at least one polyurethane prepolymer comprising at least two NCO end groups, said prepolymer being obtained by a polyaddition reaction:
of at least one asymmetric diisocyanate monomer and
of a mixture of polyester diol(s);
B) at least one triisocyanate chosen from isocyanurates, biurets, adducts of diisocyanates and of triols, and their mixtures, the —OH component is a composition comprising a mixture of polyester triol(s) (preferably of natural origin), of polyether diol(s) and of polyester diol(s).

Preferably, the —NCO and —OH components are mixed in amounts such that the ratio $r_3$ ranges from 1 to 2.5, more preferably from 1.2 to 1.9.

Preferably, the mixture of the —NCO and —OH components is such that it makes it possible to obtain a composition exhibiting a viscosity, measured at 60° C., within the range extending from 500 to 2000 mPa·s and more preferably from 1000 to 2000 mPa·s, making it possible to apply it using a conventional lamination process at a temperature of less than or equal to 60° C.

More preferably, the adhesive composition obtained after mixing the —NCO and —OH components exhibits a viscosity, measured at 50° C., within the range extending from 500 to 2000 mPa·s and more preferably from 1000 to 2000 mPa·s, making it possible to apply it at a temperature ranging from 40° C. to 50° C.

The two-component adhesive composition according to the invention can additionally comprise other ingredients, such as an aminosilane, which can be included in the —NCO component and/or in the —OH component.

The use of aminosilane confers, on the adhesive, a better resistance to hot delamination of particular use when it is desired to manufacture laminates which have to undergo a pasteurization or sterilization treatment.

The total concentration of aminosilane in the two-component adhesive composition according to the invention preferably ranges from 0.5% to 2% by weight, with respect to the total weight of the adhesive composition.

Preferably, the two-component adhesive composition according to the invention is devoid or substantially devoid of solvent. More preferably, it is solvent-free.

Multilayer Structure

The adhesive composition according to the invention can be used to manufacture a multilayer structure as described below. Thus, another subject matter of the invention is a multilayer structure comprising at least two layers of material bonded together by an adhesive layer, characterized in that said adhesive layer consists of an adhesive composition according to the invention in the crosslinked state.

The adhesive layer is obtained by crosslinking the adhesive composition (or adhesive mixture) obtained by mixing the —NCO and —OH components, in a proportion of an amount preferably of less than or equal to 5 g/m², more preferably ranging from 1.4 to 3 g/m² and better still ranging from 2 to 2.5 g/m².

The layers of material surrounding the adhesive layer generally consist of one or more materials normally used to manufacture flexible packagings.

Mention may be made, as materials which can be used, of paper, a metal, such as, for example, aluminum, and thermoplastic polymers, it being possible for the latter furthermore to be metallized or coated with specific substance(s) (for example based on silicon oxide or on aluminum oxide) in order to confer additional properties (for example of barrier to moisture, to gases ($O_2$, $N_2$, $CO_2$ and their mixtures) and/or to light and to ultraviolet (UV) rays) on the thermoplastic polymer.

Mention may be made, as thermoplastic polymers which can be used, for example, of:
polyethylene (PE),
polypropylene (PP),
a copolymer based on ethylene and propylene,
oriented or nonoriented polyamide (PA),
polyethylene terephthalate (PET), or else
a copolymer based on ethylene, such as, for example, a maleic anhydride-grafted copolymer, a copolymer of ethylene and of vinyl acetate (EVA), a copolymer of ethylene and of vinyl alcohol (EVOH) or a copolymer of ethylene and of an alkyl acrylate, such as methyl acrylate (EMA) or butyl acrylate (EBA),
polystyrene (PS),
polyvinyl chloride (PVC),
polyvinylidene chloride (PVDC),
polyvinylidene fluoride (PVDF),
a polymer or copolymer of lactic acid (PLA) or
a polyhydroxyalkanoate (PHA).

The PET or PP films can in particular be metallized (with aluminum). The preparation of these metallized films of thermoplastic polymer is well known to a person skilled in the art and makes it possible to homogeneously coat at least one of the surfaces of said film with a layer of metal (aluminum) particles, generally with a thickness of a few nanometers.

The layers of material surrounding the adhesive layer can additionally comprise one or more additives in order to confer additional properties on them. Mention may be made, as additives which can be used, for example, of slip agents and antifogging agents.

According to a preferred embodiment, the invention relates to a multilayer structure comprising at least two layers of material bonded together by at least one adhesive layer, characterized in that:

said adhesive layer consists of an adhesive composition according to the invention obtained after mixing its components in the crosslinked state, in a proportion of an amount of less than 5 g/m², and said layers of material preferably consisting of one or more materials chosen, independently of one another, from oriented polyamide (OPA), PE, PP, PET, metallized PET and aluminum.

After crosslinking, the adhesive seal (consisting of the crosslinked layer of adhesive) provides a satisfactory level of cohesion between the two layers of material, which is advantageously maintained after brief or prolonged exposure of said adhesive seal to elevated temperature, which makes it possible to manufacture, on the one hand, heat-sealable multilayer structures, that is to say structures which can in particular be subjected to a temperature of greater than or equal to 200° C. for approximately one second, and, on the other hand, sterilizable or pasteurizable multilayer structures, that is to say structures which can be exposed to temperatures ranging from 100° C. to 135° C., or else ranging from 70° C. to less than 100° C. (for example from 70° C. to 99° C.), respectively, for a period of time sufficient to ensure the sterilization or the pasteurization of the multilayer structure and, if appropriate, of the contents packaged in said structure. This period of time can vary to a large extent according to the nature of the contents packaged (for example food). Preferably, this period of time is at least 15 minutes. More preferably, this period of time ranges from 15 minutes to 2 hours.

According to a more preferred embodiment, the invention relates to a multilayer structure comprising a first layer of metal material and a second layer of material identical to or different from the first, which layers are bonded together at the metal surface of said layer of metal material by at least one adhesive layer, characterized in that:

said adhesive layer consists of an adhesive composition according to the invention obtained after mixing its components in the crosslinked state, in a proportion of an amount of less than 5 g/m².

The layer of metal material can be a sheet of aluminum or a film made of thermoplastic polymer metallized over at least one of its surfaces and preferably over just one surface (with aluminum).

The thickness of each of the two layers of material adjacent to the adhesive layer and of the other layers optionally employed in the multilayer structure according to the invention is capable of varying within a wide range extending from 5 to 150 μm. The total thickness of the multilayer structure is capable of also varying within a wide range extending from 20 to 400 μm.

Preferably, the multilayer structure is provided in the form of a multilayer film.

Process for the Manufacture of a Multilayer Structure

Another subject matter of the invention is a process for the manufacture of a multilayer structure according to the invention, comprising the following stages:

(i) the mixing of the —NCO and —OH components at an appropriate temperature, preferably at a temperature of less than or equal to 60° C., more preferably of less than or equal to 50° C., then (ii) the coating of said mixture over the surface of a first layer of material, then (iii) the laminating of the surface of a second layer of material over said coated surface, then (iv) the crosslinking of said mixture.

Preferably, the —NCO and —OH components are mixed in amounts such that the ratio $r_3$ ranges from 1 to 2.5, more preferably from 1.4 to 2 and better still from 1.5 to 1.9.

The coating of said mixture can be carried out over all or part of the surface of a material.

Preferably, the adhesive mixture is coated in a proportion of an amount preferably of less than or equal to 5 g/m², more preferably ranging from 1.4 to 3 g/m² and better still ranging from 2 to 2.5 g/m².

In particular, the coating of said mixture can be carried out in the form of a layer with a thickness ranging from 1.5 to 5 μm. The coating is preferably carried out continuously or substantially continuously.

Optionally, the crosslinking of said mixture on the surface of the material can be accelerated by heating the coated material(s) at a temperature of less than or equal to 70° C.

The coating and the laminating of the second material are generally carried out within a time interval compatible with the coating process, as is well known to a person skilled in the art, that is to say before the adhesive layer loses its ability to fix the two materials by adhesive bonding.

Use of a Multilayer Structure

Another subject matter of the invention is the use of a multilayer structure according to the invention in the manufacture of flexible packagings and in particular of heat-sealable, sterilizable and/or pasteurizable flexible packagings.

This is because the laminates according to the invention can be heat-treated without substantial loss of the level of cohesion between the layers of material bonded by an adhesive layer according to the invention.

The invention is now described in the following exemplary embodiments which are given purely by way of illustration and should not be interpreted in order to limit the scope thereof.

Examples: Two-Component Adhesive Compositions:

The two-component adhesive compositions of examples 1 to 11 were prepared in the same way by following the procedure described below. The natures and the amounts of the ingredients used are shown in table 1. The amounts of the ingredients in table 1 are expressed as % by weight of commercial product, with respect to the weight of —NCO component or weight of the —OH component, as the case may be.

The following ingredients were used:

Scuranate® T100, sold by Vencorex and corresponding to a mixture of TDI isomers comprising at least 99% by weight of 2,4-TDI isomer, assaying on average at 48.1% by weight of NCO group, with respect to the weight of said commercial product, Isonate® M125, sold by Dow and corresponding to a mixture of MDI isomers comprising 97% by weight approximately of 4,4'-MDI isomer and 3% by weight approximately of 2,4'-MDI, assaying on average at 33.6% by weight of NCO group, with respect to the weight of said commercial product, Desmodur® N3300, sold by Covestro and corresponding to an HDI trimer assaying on average at 21.8% by weight of NCO group, with respect to the weight of said commercial product, Silquest® A1100, sold by Momentive and corresponding to a γ-aminopropyltriethoxysilane having a molar mass equal to 179.29 g/mol, Voranol® P400, sold by Dow and corresponding to a polyether diol (polyoxypropylene diol obtained from propylene glycol and propylene oxide), the hydroxyl number of which is 260 mg KOH/g approximately, Voranol® CP450, sold by Dow and corresponding to a polyether triol (polyoxypropylene triol obtained from glycerol and propylene oxide), the hydroxyl number of which is 383 mg KOH/g approximately, Voranol® 1010L, sold by Dow and corresponding to a polyether diol (polyoxypropylene diol obtained from propylene glycol and propylene oxide), the hydroxyl number of which is 110 mg KOH/g approximately, Voranol® 2000L, sold by Dow and corresponding to a polyether diol (polyoxypropylene diol obtained from propylene glycol and propylene oxide), the hydroxyl number of which is 56 mg KOH/g approximately, Diethylene glycol (DEG) having a molar mass equal to 106.15 g/mol, the hydroxyl number of which is 1057 mg KOH/g approximately, Dipropylene glycol (DPG) having a molar mass equal to 134.17 g/mol, the hydroxyl number of which is 836 mg KOH/g approximately, Dekatol® 109, manufactured by Bostik and corresponding to a polyester diol obtained according to the polycondensation process as described in the present patent application, the hydroxyl number of which is 95 mg KOH/g approximately, Dekatol® 1105, manufactured by Bostik and corresponding to a polyester diol obtained according to the polycondensation process as described in the present patent application, the hydroxyl number of which is 97.5 mg KOH/g approximately, Realkyd® XTR 10410, sold by Arkema and corresponding to a polyester diol obtained according to the polycondensation process as described in the present patent application, the hydroxyl number of which is 112 mg KOH/g approximately, Realkyd® XTR 09432, sold by Arkema and corresponding to a polyester diol obtained according to the polycondensation process as described in the present patent application, the hydroxyl number of which is 138 mg KOH/g approximately, Castor oil having an OHN equal to 164 mg KOH/g approximately, CAPA™ 2043, sold by Perstorp and corresponding to a polyester diol obtained by ring opening polymerization of caprolactone, the hydroxyl number of which is 280 mg KOH/g approximately.

1.1. Preparation of the —NCO Component:

Preparation of the Polyurethane (PU) Prepolymer Having NCO Endings:

The PU prepolymers having NCO endings used in examples 1 to 10 were prepared in the same way using the different ingredients appearing in table 1. The amounts of diisocyanate(s) and of diol(s) used (expressed as % by weight of commercial product, with respect to the weight of —NCO component) correspond to an NCO/OH molar ratio ($r_1$) ranging from 1.5 to 2.5 approximately, as shown in table 2.

The diisocyanate(s) and the diol(s) are mixed in a reactor kept under constant stirring and under nitrogen, at a temperature T1 ranging from 72° C. to 80° C. The temperature is controlled so as not to exceed 80° C.

The combined substances are maintained as a mixture at this temperature until the hydroxyl functional groups of the diols have been completely consumed.

The degree of progression of the reaction is monitored by measuring the content of NCO group by back titration of dibutylamine using hydrochloric acid, according to the standard NF T52-132. The reaction is halted when the content of NCO group measured is approximately equal to the content of NCO group desired.

Preparation of the —NCO Component by Mixing its Ingredients:

The polyurethane prepolymer having NCO endings obtained is subsequently mixed, in the same reactor kept under constant stirring and under nitrogen, with the other ingredients constituting the —NCO component, namely an HDI isocyanurate and an aminosilane adhesion promoter, in the proportions shown in table 1.

After homogenization of the mixture (30 minutes), the content of NCO group and the content by weight of diisocyanate monomer in the —NCO component are respectively measured.

The content of NCO group in the —NCO component, expressed as percentage by weight with respect to the weight of the —NCO component (% NCO), is measured according to the standard NF T52-132. This content is subsequently expressed in milliequivalents of NCO groups present in 100 g of —NCO component (meq NCO/100 g) and recorded in table 2 below.

The content by weight of diisocyanate monomer is measured by an HPLC method provided with a UV detector, as described above (reversed-phase C18, mobile phase: aqueous acetonitrile solution, buffered with a 0.2% by weight aqueous tetrabutylammonium bisulfite solution at pH equal to 2.5, detection wavelength: 254 nm).

For all of the examples, the content by weight of diisocyanate monomer present in the —NCO component is less than or equal to 0.1% by weight of the weight of said component.

The results of these measurements are recorded in table 2 below.

1.2. Preparation of the —OH Component:

The different ingredients constituting the —OH component are mixed in the proportions shown in table 1, at a temperature ranging from 40° C. to 50° C., in a reactor kept under constant stirring and under nitrogen.

After homogenization of the mixture (approximately 1 hour), the content of OH group in the —OH component, expressed in milligrams of KOH per gram of —OH component (mg KOH/g), is measured. This content is subsequently expressed in milliequivalents of OH groups present in 100 g of —OH component (meq OH/100 g) and recorded in table 2 below.

1.3. Preparation of the Adhesive Composition:

The —NCO component prepared in section 1.1. and the —OH component prepared in section 1.2. are mixed, in view of their respective contents of NCO group and OH group, according to a given ratio by weight which makes it possible to achieve a given NCO/OH molar ratio ($r_3$). These ratios are shown in table 2.

The mixing is carried out via a mixing unit and a static mixer and then the mixture is introduced between the lamination metering rolls described in point 1.4. below at a temperature of approximately 50° C.

The mixture is maintained at the temperature shown in table 3, corresponding to the temperature of application of the mixture and for which the mixture exhibits a viscosity ranging from 1000 to 2000 mPa·s.

1.4. Preparation of the Multilayer Structures a, B and C:

The mixture obtained in section 1.3. is used in the manufacture:

of a bilayer structure A, the first layer of which consists of a film of oriented polyamide (OPA) with a thickness of 15 μm and the second layer of which consists of a film of polyethylene (PE) with a thickness of 50 μm; and of a bilayer structure B, the first layer of which consists of a film of metallized (aluminum) PolyEthylene Terephthalate (PTE) with a thickness of 12 μm and the second layer of which consists of a film of PE with a thickness of 50 μm; and of a trilayer structure C, the first layer of which consists of a film of PET with a thickness of 12 μm, the second layer of which consists of a sheet of aluminum with a thickness of 7 μm and the third layer of which consists of a film of PE with a thickness of 50 μm.

Use is made, for this, of a lamination machine of Nordmeccanica type provided with a roll-type coating device operating at a temperature of 50° C. and at a rate of forward progression of 50 meters per minute; the adhesive layer is applied between each of the individual layers of material of the bilayers and trilayers described above as a layer having a thickness of approximately 2 μm, corresponding to an application of approximately 2.5 grams of adhesive per square meter of film. In the case of the bilayer structure B, the adhesive layer connects the metallized surface of the film of metallized PET to a surface of the film of PE.

1.5. Measurement of the Cohesion of the Multilayer Structures a, B and C at Ambient Temperature (23° C.) Before Pasteurization:

In order to complete the crosslinking of the adhesive layer, a multilayer structure obtained in section 1.4. is placed, for 7 to 30 days, in a climate-controlled chamber maintained at a temperature of 23° C. and a relative humidity of 50%.

Said multilayer structure is subsequently subjected to the 180° peel test in accordance with section 1.7.

1.6. Resistance to the Pasteurization of the Bilayer Structure A:

A multilayer structure A obtained in section 1.4. is placed in an autoclave at 90° C. in the vapor phase for one hour, in order to pasteurize it, and a 180° peel test is carried out immediately after removing from the oven.

It is considered that the multilayer structure exhibits a satisfactory resistance to the pasteurization when the level of cohesion measured before and after pasteurization (respectively in sections 1.5. and 1.6.) is substantially equal. In particular, this is reflected by a difference in the value obtained in the 180° peel test after pasteurization of less than or equal to 30% from the value measured before pasteurization.

It was observed, for all the adhesive compositions tested, that the laminate A exhibits a satisfactory resistance to the pasteurization.

1.7. Description of the 180° Peel Test of a Bilayer Structure:

The cohesion of the laminate is evaluated by the 180° peel test as described in the French standard NF T 54-122. The principle of this test consists of the determination of the force necessary for the separation (or peeling) of two individual layers of material bonded by the adhesive.

A test specimen of rectangular shape with a width of 15 mm and with a length of approximately 10 cm is cut out from the laminate. The two individual layers of material included in this strip are manually detached from the end of this test specimen, and over approximately 2 cm, and the two free ends thus obtained are attached to two holding devices respectively connected to a stationary part and a movable part of a tensile testing device which are located on a vertical axis.

While a drive mechanism imparts a uniform rate of 100 mm/minute to the movable part, resulting in the detachment of the two layers, the detached ends of which gradually move along a vertical axis with the formation of an angle of 180°, the stationary part-connected to a dynamometer—measures the force withstood by the test specimen thus held, which force is measured in newtons.

1.8. Description of the 180° Peel Test of a Trilayer Structure:

The cohesion of the laminate is evaluated in the same way as for a bilayer structure at the interface between the layer of PET and the composite layer consisting of the individual layers of aluminum (Al) and of PE. The force necessary for the separation (or peeling) of the layer of PET and of the aluminum-PE layer is measured.

The same test is carried out at the interface between the composite layer consisting of the individual layers of PET and of aluminum (PET-aluminum) and the layer of PE.

Generally, it is considered that the level of cohesion of the layer of an adhesive is satisfactory when the value obtained in the 180° peel test on the laminate:

formed of two thermoplastic films is greater than or equal to 3 newtons (N), formed of a thermoplastic film and of a metal sheet (of aluminum) is greater than or equal to 3 newtons (N), formed of a thermoplastic film and of a metallized thermoplastic film (metallized with aluminum) is greater than or equal to 1 newton (N).

The results obtained with regard to the multilayer structures A, B and C are collated in table 3. The sign "Yes" means that the level of cohesion is satisfactory. The sign "No" means that the level of cohesion is insufficient.

Thus, the multilayer structures of examples 2 to 9, which satisfy the peel test described above, exhibit a satisfactory level of cohesion, that is to say a level of cohesion which is greater than or equal to the minimum required to manufacture flexible packagings or to be used as such as flexible packagings.

TABLE 1

|  |  |  | Ex. 1 comp. | Ex. 2 | Ex. 3 | Ex. 4 | Ex. 5 | Ex. 6 |
|---|---|---|---|---|---|---|---|---|
| —NCO component | PU prepolymer having NCO endings | Scuranate ® T100 (48.1% NCO) | 23.80 | 30.46 | 30.46 | 30.46 | 30.46 | 32.44 |
|  |  | Voranol ® P400 (OHN = 260 mg KOH/g) | 21.40 | 38.51 | 38.51 | 38.51 | 38.51 | 39.80 |
|  |  | Voranol ® 2000 L (OHN = 56 mg KOH/g) | 8.80 | — | — | — | — | — |
|  |  | CAPA 2043 (OHN = 280 mg KOH/g) | — | — | — | — | — | — |

TABLE 1-continued

|  |  |  |  |  |  |  |
|---|---|---|---|---|---|---|
| Realkyd ® XTR 10410 (OHN = 112 mgKOH/g) | 24.80 | 10.02 | 10.02 | 10.02 | 10.02 | 17.06 |
| NCO/OH ratio (r₁) | 1.7 | 1.8 | 1.8 | 1.8 | 2.1 | 1.7 |
| Desmodur ® N3300 (21.8% NCO) | 20.00 | 20.03 | 20.03 | 20.03 | 20.03 | 10.07 |
| Silquest ® A1100 | 1.20 | 0.98 | 0.98 | 0.98 | 0.98 | 0.63 |
| Total of the ingredients of the —NCO component | 100 | 100 | 100 | 100 | 100 | 100 |
| —OH component Castor oil | 95 | 95 | 85 | — | — | 90 |
| DEG | — | — | — | — | — | 5 |
| DPG | — | — | — | — | — | — |
| Voranol ® CP450 (OHN = 383 mg KOH/g) | 5 | 5 | 15 | 20 | 10 | 5 |
| Voranol ® P400 (OHN = 260 mg KOH/g) | — | — | — | — | 10 | — |
| Dekatol ® 109 (OHN = 95 mg KOH/g) | — | — | — | — | — | — |
| Dekatol ® 1105 (OHN = 97 mg KOH/g) | — | — | — | — | — | — |
| Realkyd ® XTR 09432 (OHN = 138 mg KOH/g) | — | — | — | 80 | 80 | — |
| Isonate ® M125 (33.6% NCO) | — | — | — | — | — | — |
| Total of the ingredients of the —OH component | 100 | 100 | 100 | 100 | 100 | 100 |

|  |  |  | Ex. 7 | Ex. 8 | Ex. 9 | Ex. 10 comp. | Ex. 11 |
|---|---|---|---|---|---|---|---|
| —NCO component | PU prepolymer having NCO endings | Scuranate ® T100 (48.1% NCO) | 34.64 | 34.64 | 37.06 | 22.20 | 31.44 |
|  |  | Voranol ® P400 (OHN = 260 mg KOH/g) | 44.16 | 44.16 | 51.74 | 22.20 | — |
|  |  | Voranol ® 2000 L (OHN = 56 mg KOH/g) | — | — | — | 45.60 | — |
|  |  | CAPA 2043 (OHN = 280 mg KOH/g) | — | — | — | — | 37.25 |
|  |  | Realkyd ® XTR 10410 K (OHN = 112 mgOH/g) | 10.00 | 10.00 | — | — | 9.69 |
|  |  | NCO/OH ratio (r₁) | 1.8 | 1.8 | 1.8 | 1.7 | 2.2 |
|  | Desmodur ® N3300 (21.8% NCO) |  | 10.00 | 10.00 | 10.00 | 10.00 | 20.67 |
|  | Silquest ® A1100 |  | 1.20 | 1.20 | 1.20 | — | 0.95 |
| Total of the ingredients of the —NCO component |  |  | 100 | 100 | 100 | 100 | 100 |
| —OH component | Castor oil |  | 90 | — | 90 | 90 | 10 |
|  | DEG |  | 5 | — | 5 | 5 | — |
|  | DPG |  | — | 1.92 | — | — | — |
|  | Voranol ® CP450 (OHN = 383 mg KOH/g) |  | 5 | 23.92 | 5 | 5 | — |
|  | Voranol ® P400 (OHN = 260 mg KOH/g) |  | — | — | — | — | 80 |
|  | Dekatol ® 109 (OHN = 95 mg KOH/g) |  | — | 71.77 | — | — | — |
|  | Dekatol ® 1105 (OHN = 97 mg KOH/g) |  | — | — | — | — | — |
|  | Realkyd ® XTR 09432 (OHN = 138 mg KOH/g) |  | — | — | — | — | 10 |
|  | Isonate ® M125 (33.6% NCO) |  | — | 2.39 | — | — | — |
| Total of the ingredients of the —OH component |  |  | 100 | 100 | 100 | 100 | 100 |

TABLE 2

|  |  | Ex. 1 comp. | Ex. 2 | Ex. 3 | Ex. 4 | Ex. 5 | Ex. 6 | Ex. 7 | Ex. 8 | Ex. 9 | Ex. 10 comp. | Ex. 11 |
|---|---|---|---|---|---|---|---|---|---|---|---|---|
| —NCO component | NCO diisocyanate/NCO triisocyanate molar ratio (r₂) | 2.6 | 3.4 | 3.4 | 3.4 | 3.4 | 7.1 | 7.6 | 7.6 | 8.2 | 4.9 | 3.4 |
|  | Content of NCO groups in the —NCO component (meq NCO/100 g) | 212 | 249 | 249 | 249 | 249 | 202 | 217 | 217 | 230 | 158 | 259 |
| —OH component | Content of OH groups in the —OH component (meq OH/100 g) | 312 | 312 | 351 | 333 | 315 | 391 | 391 | 321 | 391 | 391 | 418 |
| Mixture of the —NCO and —OH components | Polyether polyol/polyester polyol ratio by weight (r₄) | 0.5 | 0.7 | 0.9 | 0.9 | 1.0 | 1.0 | 1.2 | 1.3 | 1.8 | 5.1 | 0.6 |
|  | —NCO component/—OH component ratio by weight | 100/45 | 100/50 | 100/45 | 100/55 | 100/50 | 100/30 | 100/33 | 100/45 | 100/35 | 100/15 | 100/40 |
|  | NCO/OH molar ratio (r₃) | 1.5 | 1.6 | 1.6 | 1.4 | 1.6 | 1.7 | 1.7 | 1.5 | 1.7 | 2.7 | 1.5 |
|  | Temperature of application of the mixture | 50° C. | 50° C. | 50° C. | 50° C. | 50° C. | 60° C. | 60° C. | 60° C. | 60° C. | 70° C. | 50° C. |

TABLE 3

| | | | Ex. 1 comp. | Ex. 2 | Ex. 3 | Ex. 4 | Ex. 5 | Ex. 6 | Ex. 7 | Ex. 8 | Ex. 9 | Ex. 10 comp. | Ex. 11 |
|---|---|---|---|---|---|---|---|---|---|---|---|---|---|
| 180° peeling before pasteurization (in N/15 mm) | Bilayer A (≥3 N/15 mm) | OPA/PE | Yes | Yes | Yes | Yes | Yes | Yes | Yes | Yes | Yes | Yes | Yes |
| | Bilayer B (≥1 N/15 mm) | metPET/PE | No | Yes | Yes | Yes | Yes | Yes | Yes | Yes | Yes | No | Yes |
| | Trilayer C (≥3 N/15 mm) | PET/Al | No | Yes | Yes | Yes | Yes | Yes | Yes | Yes | Yes | No | Yes |
| | | Al/PE | No | Yes | Yes | Yes | Yes | Yes | Yes | Yes | Yes | No | Yes |

The invention claimed is:

1. A two-component polyurethane-based adhesive composition comprising an —NCO component and an —OH component, wherein:
the —NCO component is a composition comprising:
A) at least one polyurethane prepolymer comprising at least two NCO end groups, said at least one polyurethane prepolymer obtained by a polyaddition reaction comprising reacting
at least one asymmetric diisocyanate monomer and
at least one diol, wherein the diol has a hydroxyl number (OHN) of 112 to 280 mg KOH/g, wherein the polyaddition reaction takes place in amounts of diisocyanate monomer(s) and of diol(s) resulting in an NCO/OH molar ratio, denoted $r_1$, ranging from 1.5 to 2.2, and
B) at least one triisocyanate selected from the group consisting of isocyanurates, biurets, adducts of diisocyanates and of triols, and their mixtures; and
the —OH component is a composition comprising at least one polyol,
wherein for the two-component polyurethane-based adhesive composition, at least one of the at least one polyol of the —OH component or the at least one diol used for obtaining the —NCO component comprises a polyether polyol or a polyether diol, at least one of the at least one polyol of the —OH component or the at least one diol used for obtaining the —NCO component comprises a polyester polyol or a polyester diol, and
a ratio by weight of an amount of polyether polyol(s) to an amount of polyester polyol(s), denoted $r_4$, ranges from 0.6 to 2.2, wherein for the determination of the ratio $r_4$, an amount of a polyester diol is included in the amount of polyester polyol and an amount of a polyether diol is included in the amount of polyether polyol,
wherein the adhesive is constituted such that when it is used to form an adhesive layer bonding a thermoplastic film and a metal sheet, the level of cohesion of the adhesive layer is greater than or equal to 3 N/15 mm, wherein the level of cohesion is tested by the 180° peel test French standard NF T 54-122.

2. The composition as claimed in claim 1, wherein the asymmetric diisocyanate monomer is selected from the group consisting of:
isophorone diisocyanate (IPDI),
2,4-toluene diisocyanate (2,4-TDI) and its hydrogenated form,
2,4'-diphenylmethane diisocyanate (2,4'-MDI) and its hydrogenated form,
and their mixtures.

3. The composition as claimed in claim 1, wherein the at least one diol used for obtaining the —NCO component is selected from the group consisting of polyether diol(s), polyester diol(s) and their mixtures.

4. The composition as claimed in claim 3, wherein the at least one diol used for obtaining the —NCO component comprises a mixture of polyether diol(s) and polyester diol(s).

5. The composition as claimed in claim 1, wherein the at least one polyol of the —OH composition is selected from the group consisting of polyether polyols, polyester polyols, and polyurethane prepolymers comprising at least two OH groups and their mixtures.

6. The composition as claimed in claim 5, wherein the at least one polyol of the —OH composition is selected from the group consisting of polyether diols, polyester diols, polyether triols, polyalkylene triols, polyester triols, and their mixtures.

7. The composition as claimed in claim 1, wherein the polyaddition reaction takes place in the presence or absence of at least one reaction catalyst, at a reaction temperature T1 of less than 95° C., under anhydrous conditions.

8. The composition as claimed in claim 1, wherein the triisocyanate comprises a diisocyanate isocyanurate of general formula (I):

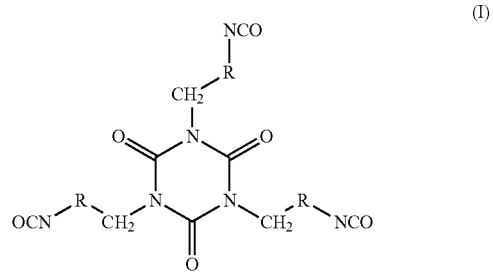

wherein:
R represents a linear, branched or cyclic and aliphatic or aromatic alkylene group comprising from 4 to 9 carbon atoms,
with the proviso that the NCO groups are not connected via a covalent bond to a carbon atom forming part of an aromatic hydrocarbon ring.

9. The composition as claimed in claim 1, wherein the —NCO component comprises a content of aliphatic diisocyanate monomer(s) of less than or equal to 0.5% by weight, with respect to the weight of the —NCO component, and a content of aromatic diisocyanate monomer(s) of less than or equal to 0.1% by weight, with respect to the weight of the —NCO component.

10. The composition as claimed in claim 1, wherein the —NCO and —OH components are in amounts such that an NCO/OH molar ratio, denoted $r_3$, ranges from 1 to 2.5.

11. The composition as claimed in claim 1, wherein a molar ratio of a number of NCO groups present in a total amount of diisocyanate monomer(s) used for synthesis of the polyurethane prepolymer having NCO endings A) to the number of NCO groups present in the total amount of triisocyanate(s) B) present in the —NCO component, denoted $r_2$, ranges from 3 to 8.5.

12. The composition as claimed in claim 11, wherein the $r_2$ ratio ranges from 3 to 5.

13. The composition as claimed in claim 1, wherein the content of NCO groups of the —NCO component ranges from 220 to 280 meq NCO per 100 g of the —NCO component.

14. The composition as claimed in claim 1, wherein the composition does not comprise solvent.

15. A multilayer structure comprising at least two layers of material bonded together by an adhesive layer, wherein said adhesive layer comprises the adhesive composition of claim 1, said composition obtained by mixing the —NCO and —OH components in a crosslinked state.

16. A process for the continuous manufacture of a multilayer structure as claimed in claim 15, comprising the following stages:
   (i) mixing the —NCO and —OH components at a temperature of less than or equal to 60° C. to form a mixture, then
   (ii) coating said mixture over a surface of a first layer of material to form a coated surface, then
   (iii) laminating a surface of a second layer of material over said coated surface, then
   (iv) crosslinking said mixture.

17. A two-component polyurethane-based adhesive composition comprising an —NCO component and an —OH component, wherein:
   the —NCO component is a composition comprising:
   A) at least one polyurethane prepolymer comprising at least two NCO end groups, said at least one polyurethane prepolymer obtained by a polyaddition reaction comprising reacting
   at least one asymmetric diisocyanate monomer and
   at least one diol, wherein the diol has a hydroxyl number (OHN) of 112 to 280 mg KOH/g, wherein the polyaddition reaction takes place in amounts of diisocyanate monomer(s) and of diol(s) resulting in an NCO/OH molar ratio, denoted $r_1$, ranging from 1.5 to 2.2, and
   B) at least one triisocyanate selected from the group consisting of isocyanurates, biurets, adducts of diisocyanates and of triols, and their mixtures; and
   the —OH component is a composition comprising at least one polyol,
      wherein for the two-component polyurethane-based adhesive composition, at least one of the at least one polyol of the —OH component or the at least one diol used for obtaining the —NCO component comprises a polyether polyol or a polyether diol, at least one of the at least one polyol of the —OH component or the at least one diol used for obtaining the —NCO component comprises a polyester polyol or a polyester diol, and
      a ratio by weight of an amount of polyether polyol(s) to an amount of polyester polyol(s), denoted $r_4$, ranges from 0.6 to 2.2, wherein for the determination of the ratio $r_4$, an amount of a polyester diol is included in the amount of polyester polyol and an amount of a polyether diol is included in the amount of polyether polyol,
   wherein the adhesive is constituted such that when it is used to form an adhesive layer bonding a thermoplastic film and a metallized thermoplastic film, the level of cohesion of the adhesive layer is greater than or equal to 1 N/15 mm, wherein the level of cohesion is tested by the 180° peel test French standard NF T 54-122.

* * * * *